(12) United States Patent
Cadeo

(10) Patent No.: US 9,295,279 B2
(45) Date of Patent: Mar. 29, 2016

(54) SYSTEM AND METHOD FOR PASTEURIZING AT LEAST ONE LIQUID

(75) Inventor: Angelo Cadeo, Oftringen (CH)

(73) Assignee: Miteco AG, Zofingen (CH)

( * ) Notice: Subject to any disclaimer, the term of this patent is extended or adjusted under 35 U.S.C. 154(b) by 7 days.

(21) Appl. No.: 13/698,758

(22) PCT Filed: May 20, 2010

(86) PCT No.: PCT/CH2010/000129
§ 371 (c)(1),
(2), (4) Date: Nov. 19, 2012

(87) PCT Pub. No.: WO2011/143782
PCT Pub. Date: Nov. 24, 2011

(65) Prior Publication Data
US 2013/0064952 A1    Mar. 14, 2013

(51) Int. Cl.
| | | |
|---|---|---|
| A23L 3/00 | (2006.01) | |
| A23C 3/033 | (2006.01) | |
| A23L 3/22 | (2006.01) | |

(52) U.S. Cl.
CPC ............ *A23L 3/00* (2013.01); *A23C 3/0332* (2013.01); *A23L 3/003* (2013.01); *A23L 3/22* (2013.01); *A23L 3/001* (2013.01)

(58) Field of Classification Search
CPC ............ A23L 3/00; A23L 3/003; A23L 3/22; A23L 3/001; A23C 3/0332
USPC .................................................. 426/521, 233
See application file for complete search history.

(56) References Cited

U.S. PATENT DOCUMENTS

| | | | |
|---|---|---|---|
| 2,897,082 A | | 7/1959 | Kaiser |
| 4,313,370 A | * | 2/1982 | Skoli et al. ............... 99/323.1 |
| 4,667,590 A | * | 5/1987 | Balaam et al. ............ 99/470 |
| 4,972,386 A | * | 11/1990 | Lau ........................... 367/99 |
| 5,160,633 A | * | 11/1992 | Hong et al. ............... 210/739 |
| 2002/0172745 A1 | | 11/2002 | Palaniappan |
| 2004/0187707 A1 | * | 9/2004 | Nielsen et al. ............ 99/453 |

FOREIGN PATENT DOCUMENTS

| | | |
|---|---|---|
| DE | 21 62 115 | 6/1973 |
| DE | 35 10 412 | 9/1986 |
| FR | 2 165 430 | 8/1973 |
| NL | 1 024 796 | 5/2005 |
| WO | WO 00/67598 | 11/2000 |
| WO | WO 03/077685 | 9/2003 |

OTHER PUBLICATIONS

International Search Report of PCT/CH2010/000129, Feb. 28, 2011.

* cited by examiner

*Primary Examiner* — Erik Kashnikow
*Assistant Examiner* — Preston Smith
(74) *Attorney, Agent, or Firm* — Collard & Roe, P.C.

(57) ABSTRACT

The invention relates to a system and method for pasteurizing a liquid product (P) consisting of at least one liquid component that can be pumped, comprising a supply container (6) for making the unpasteurized product available, an inlet line (8*a*) for conveying the unpasteurized product, a pasteurization circuit (25) for pasteurizing the product (P), and an outlet line (8*b*) for conveying the pasteurized product. The pasteurization circuit (25) comprises a buffer container (2) for holding the product (P) during a prescribed constant contact time for pasteurization and a fluctuating flow rate of the product (P) through the buffer container (2).

9 Claims, 1 Drawing Sheet

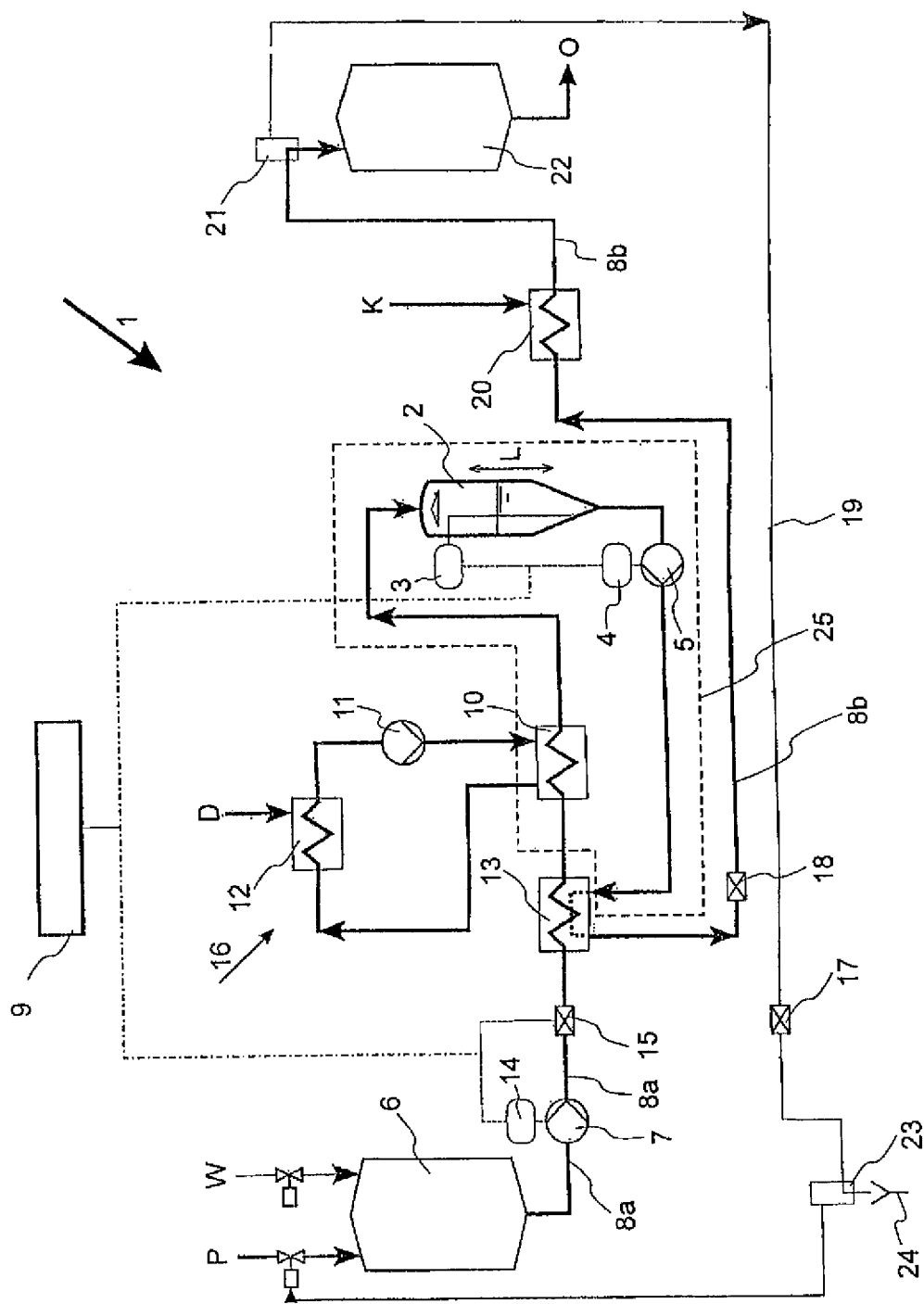

SYSTEM AND METHOD FOR PASTEURIZING AT LEAST ONE LIQUID

CROSS REFERENCE TO RELATED APPLICATIONS

This application is the National Stage of PCT/CH2010/000129 filed on May 20, 2010, the disclosure of which is incorporated by reference. The international application under PCT article 21(2) was not published in English.

TECHNICAL FIELD

The invention relates to a system for pasteurizing a liquid product consisting of at least one liquid component that can be pumped, with a supply container for supplying the unpasteurized product, an inlet line and an outlet line for conveying the unpasteurized product, a heating circuit for heating up the product to a pasteurization temperature and a pasteurization circuit for pasteurizing the product, and a method for pasteurizing the liquid product according to the preambles of the independent claims.

BACKGROUND

Devices and methods offering solutions for pasteurizing a liquid product consisting of one or more components are known in the production of liquid products. Tasks of such systems or methods respectively, comprise the provision of the liquid product, the pasteurization itself and the supply of the mixed liquid product to installations for further processing. Typically, a further processing step consists in filling the liquid product into containers provided for this. For example, a variety of refreshing beverages, particularly products containing milk, etc. are produced in the food industry by means of such systems.

The pasteurization of the untreated product plays a central role in ensuring the product quality. The pasteurization is a method for which a liquid is heated up for a short period of time and is subsequently cooled down again, by which most bacteria are killed. For this, it is important that the product to be pasteurized remains a certain time under the influence of the higher temperature. This time period is called "contact time". It is of e.g. around 30 seconds at 75 to 90° C. After this time the product is again cooled down and is deemed to be harmless for consumption. However, the contact time also depends on the temperature. In order to take into account this dependence, a variable, the pasteurization unit, has been introduced. It is calculated according to the following equation:

$$PU = t \times 1.39^{(T-60°)}$$

Thereby, t is the resting time in minutes at the temperature T. In order to reach a reliable pasteurization, a substantially constant number of pasteurization units shall be maintained. Thus, according to this equation it is possible to vary the temperature, keeping the contact time constant, or to vary the contact time, keeping the temperature constant, within certain limits, such that PU remains substantially constant.

In order to satisfy this requirement, in known solutions the products to be pasteurized are guided for the required contact time through pipe coils which are kept hot. Depending on the shape of these pipe devices, like e.g. the number of deviations, the path of the product can be extended or shortened at the constant temperature by means of which the contact time can be changed. Parallel pipe systems with different features are also used, wherein the liquid to be pasteurized can be guided either through the one or through the other pipe system in order to satisfy different pasteurization requirements in the same installation.

On the other hand there are also solutions in case of which the temperature is varied, however this has the disadvantage that a temperature regulation per se is not efficient and is difficult to be realised because of the inherent inertia of such a regulation, particularly in case of small temperature variations.

Systems using a combination of both described methods are also known.

After the pasteurization the product is e.g. cooled down and transported further. Often, the product which was pasteurized in this way is filled into a so-called aseptic container, in other words a bacteria-free container, before it is supplied to e.g. a filler device. These filler devices are subject to the so-called stop-go principle, i.e. varying quantities of the liquid product are extracted non-continuously. If the delivery has to be interrupted, the product is guided back by cooling it down, as the case may be, and has to be pasteurized again because the bacteria-free state cannot be ensured anymore. If the interruption exceeds a certain time period, this process has to be repeated, with the result that the same product has to be heated up and cooled down multiple times. This can only be done a couple of times, whereafter the product is unusable because of thermal stress. The consequence is that the system has to be cleaned up by means of water and only after that new unpasteurized product can be refilled. This is disadvantageous for the operators of such systems because they loose on the one hand valuable production time and on the other hand a high quantity of the product.

DISCLOSURE OF THE INVENTION

The invention has the objective to provide a system which has a high flexibility in absorbing supply interruptions of the product to an installation for further processing. Furthermore, it is an objective of the invention to provide a method for pasteurization of liquid products.

This objective is solved by a system for pasteurizing a liquid product consisting of at least one liquid component that can be pumped. The system comprises a supply container for supplying the unpasteurized product, an inlet line for conveying the unpasteurized product, a pasteurization circuit for pasteurizing the product, and an outlet line for conveying the pasteurized product. The pasteurization circuit comprises a buffer container for holding the product during a prescribed constant contact time for pasteurization and a fluctuating flow rate of the product through the buffer container.

Furthermore, a method for pasteurizing a liquid product is claimed, consisting of at least one liquid component that can be pumped, for which the unpasteurized product is supplied out of a supply container into an inlet line, is subsequently pasteurized in a pasteurization circuit and the pasteurized product is supplied to an outlet line. The product is supplied to a buffer container in the pasteurization circuit and is held in it during a prescribed constant contact time for the pasteurization and in the presence of a fluctuating flow rate of the product through the buffer container.

Thus, according to the claims, a system and a method with a buffer function in the pasteurization circuit are provided. By this, it is departed from the conventional solutions based on the use of pipe coils and on a constant transport quantity in order to maintain the contact time and which imply a temperature regulation. In case of the present solution the observance of the contact time is given by the use of the buffer container which can receive a variable quantity of a product to pasteurize. This regulation is easier to achieve and results in a better energy balance. Particularly, by controlling/regulating the inlet into the buffer container and, as the case may be, also by controlling/regulating the outlet paths out of the buffer container, it is possible to adjust the level of the product in the buffer container.

SHORT DESCRIPTION OF THE DRAWINGS

The drawing shows a schematic of an embodiment of a system according to the invention with corresponding components and their connections.

WAY OF CARRYING OUT THE INVENTION

Further advantageous embodiments of the invention result from the dependent claims and from the embodiment examples described in the following by means of the FIGURE.

The FIGURE shows a preferred embodiment of the system 1 with corresponding components and their connections.

The components of the system 1 and their connections are described first and subsequently the path of the product P through the system 1 by taking into account the special features of the components.

The product P to be pasteurized is filled into a supply container 6. Water W can equally be filled into the container 6. The function of the water W will be explained later in more detail. The supply container 6 is connected to a pasteurization circuit 25, which is indicated by the dashed lines, by means of an inlet line 8a. A first pump 7, which preferably has a variable flow rate, is arranged in the inlet line 8a downstream of the supply container 6. The actual flow quantity through the inlet line 8a is measured by a flow meter 15, wherein the measurement result is supplied to a controller 9. In case of deviations of the actual flow quantity from the target flow quantity, the controller 9 controls a first control element 14 which post-regulates the first pump 7 in a known way until a correct flow quantity is measured. The flow rate may however also be regulated by other means, e.g. by means of a regulating valve arranged downstream of the first pump 7. A recuperation zone 13 is arranged downstream of the flow meter 15, which takes care of a heat exchange of the product flowing through it. This will be explained in more detail later. A pasteurization circuit 25 is arranged downstream of the recuperation zone 13. It comprises a first heat exchanger 10, e.g. a plate heat exchanger, which is coupled to an external heating circuit 16. It is understood that the heating circuit may also be a part of the pasteurization circuit 25.

The construction of a heating circuit 16 is known and is only shortly explained here for the sake of completeness. It comprises a transport line for hot water for supplying energy to the first heat exchanger 10, a second heat exchanger 12 which keeps up the heat energy of the hot water in the heating circuit 16 by means of supplied steam D and a pump 11 for transporting the hot water through the transport line.

A buffer container 2 is arranged in the pasteurization circuit 25 downstream of the first heat exchanger 10, inside which the main pasteurization phase takes place, i.e. the storage of the product at a target temperature for the time period of the contact time. The buffer container has a content of e.g. 100 or 300 liters. It comprises preferably at least one, particularly exchangeable, baffle device for controlling the product flow direction, arranged in its interior. The baffle device is not shown here because of clarity reasons. Its task is explained in more detail in connection with the explanation of the product path through the system. Furthermore, the buffer container 2 comprises preferably at least one insulating layer for thermally insulating the content against the ambient, which covers substantially entirely its walls and which is not shown here. Preferably, the inner walls of the buffer container 2 are polished smooth.

A flow meter 3 for measuring the filling level inside the buffer container 2 is provided at the buffer container 2. The variable filling level is illustrated by the double arrow L.

A second pump 5 is arranged downstream of the buffer container 2, which is preferably a pump with variable flow rate. The pump is connected to a second control element 4, e.g. a motor with a frequency converter, for adjusting the desired flow rate of the pasteurized product P.

The controller 9 is connected to the filling level meter 3 for capturing the current filling level of the buffer container 2. Furthermore, it is connected to the second control element 4 in order to capture and control the current flow rate of the product P through the second pump 5. The connections of the controller 9 are illustrated by the dashed/dotted lines. They are not shown here exclusively. In fact the controller 9 may also be used to capture other parameters of the system 1, e.g. the temperature of the product P in different phases.

The second pump 5 is connected to the recuperation zone 13 at the output of the pasteurization circuit 25. After the recuperation zone 13 the pasteurized product is guided into an outlet line 8b. A first refractometer 18 for determining the density of the pasteurized product P is arranged in the outlet line 8b. Furthermore, a third heat exchanger 20 is arranged in the outlet line 8b, being used for cooling the pasteurized product P by means of cooling water K. Downstream of the third heat exchanger 20 the end product P may be passed on to an installation for further processing, e.g. a filler, which is not shown here. Alternatively, it may be filled into an aseptic container 22, from which it is passed on to the installation for further processing via the line O. A first switch 21 may be provided at the inlet of the aseptic container in order to redirect the end product into a disposal line 19 in order to be disposed of. A second refractometer 17 is arranged in this line 19, which measures the density of the end product P to be disposed of. A second switch 23 is arranged at the outlet of the disposal line 19, by means of which the discharged end product P may either be disposed of in a sewer 24 or may be guided back into the supply container 6.

Now, the path of the product through the system is described. For the sake of better understanding, temperature values of the product P are given, which shall however only serve as examples. Other temperature values are readily possible.

The unpasteurized product P is pumped out of the supply container 6 through the recuperation zone 13 by means of the first pump 7. The product P has a temperature of 20° C. before the recuperation zone 13. In the recuperation zone 13 it is heated up strongly and has a temperature of already 85° C. at the exit of the recuperation zone 13. It is heated up more to the required pasteurization temperature of 90° C. by means of the first heat exchanger 10 and thereafter it gets into the buffer container 2. Because of the insulation of the buffer container 2 the product keeps its temperature of 90° C.

In the buffer container 2 the product particles follow the path to the outlet of the buffer container 2 and are pasteurized during this contact time. During the passage from the inlet of the buffer container 2 until its outlet it is desired that a piston flow is present in order to make sure that substantially all particles of the product P remain in the buffer container 2 for the duration of the same contact time. The usage of the buffer container 2 has a further advantage because of its constitution; the flow inside it is less turbulent than inside pipe coils, in case of which turbulence is generated at each deviation. However, the already described at least one baffle device is used to further reduce turbulences. It can e.g. be a mesh by means of which the direction of the velocity vector of the particles flowing through the mesh are parallelized and the majority of them point in the direction of the outlet of the buffer container 2. The mesh may be dimensioned to be fine or coarse depending on the consistency of the product and is preferably exchangeable in this sense.

After passing through the buffer container 2 the pasteurized product exits the buffer container 2 and is transported into the recuperation zone 13 by means of the second pump 5, still having a temperature of almost 90° C. The path of the pasteurized product P in the recuperation zone 13 is illustrated by the dashed line. Because of the energy balance the product has a temperature of 25° C. at the exit of the recuperation zone and the entrance into the outlet line 8$b$. This is known and is not explained here in more detail.

Subsequently, the pasteurized product P is guided into the third heat exchanger 20 and is cooled down to a desired end temperature therein. Finally, the cooled down, pasteurized end product P is transported into the aseptic container 22 and further into the device for further processing. This type of filling is called "aseptic cold-filling".

Alternatively to the cold-filling (aseptic cold-filling), the present invention can amongst others also be used for a so-called "hot-filling" which is not shown here. In case of this hot-filling the still warm, pasteurized product P is directly filled, such that the third heat exchanger 20, the recuperation zone 13 and the optional aseptic container 22 are obsolete.

As already described, the quantity of the unpasteurized product P per time unit flowing out of the inlet line 8$a$ into the pasteurization circuit 25 and into the buffer container 2 is regulated by means of the first pump 7 arranged downstream of the supply container 6 and the delivery quantity of the pasteurized product P per time unit is regulated by the second pump 5 of the pasteurization circuit 25, which is arranged downstream of the buffer container 2. By the interaction of the first and the second pump 7, 5 an efficient level regulation can be achieved inside the buffer container 2, such that on the one hand the contact time in the buffer container 2 can always be maintained and on the other hand the delivery quantity of the pasteurized product P can be adjusted to the requirements of the device for further processing. This interaction is controlled and adjusted by means of the controller 9 which calculates the required delivery quantity per time unit, which shall be fed out of the inlet line 8$a$ into the pasteurization circuit 25 and which shall be supplied out of the pasteurization circuit 25 into the outlet line 8$b$, depending on at least one parameter. This parameter may e.g. be the filling level in the buffer container 2. The filling level in the aseptic container 21 can be used as a further parameter. Other parameters, e.g. an extraction rate of the end product P from the aseptic container, etc. are also possible. It is understood that individual parameters or a combination of parameters can be used. After the calculation by the controller 9 the required product quantity per time unit for the first and the second pump 7, 5 is adjusted by means of the respective control element 14, 4.

A special operation case arises in case of a stop of the supply of the end product P to the device for further processing. This is a frequent operation case and therefore has to be taken into consideration for a pasteurization system. Such a stop may arise e.g. by interruptions in the installation arranged downstream of the pasteurization system, e.g. filler or labelling machine, because of changes in the filling rate.

In case of known solutions with a constant product throughput the product has to be guided back into the supply container in such a case. The alternative would be to dispose of the product until the entire circuit has been pumped out. However, this would lead to a too high wasting of the product, particularly because in many cases the delivery stop is of short duration. Because of this, the product is guided back and mixes with the still unpasteurized product present in the supply container 6. After a new delivery start the portion of the product which has been guided back is pasteurized once more. In case of multiple delivery stops it is possible that the product has to be pasteurized several times, with the result that it looses its quality and cannot be consumed anymore. The consequence is that the pasteurization system has to be entirely emptied and the contents have to be disposed of. The practice shows that this case occurs regularly. By this, the operator faces high costs which have to be avoided or minimized.

In case of the present invention this undesired effect is at least minimized because a certain duration of the delivery stop can be bridged because of using the buffer container 2. It is only when this duration has lapsed without a production restart that the product has to be guided back. Consequently, the number of times the product is guided back and pasteurized again is reduced, with the consequence that the entire emptying of the pasteurization system 1 can in many cases be avoided.

After a stop of the delivery of the end product to the installation for further processing, a stop or a reduction of the delivery of the pasteurized product P out of the pasteurization circuit 25 is triggered by the controller 9. After stopping the delivery of the end product P the supply of the unpasteurized product P into the buffer container 2 is additionally reduced to a minimum product quantity per time unit. The minimum product quantity per time unit may e.g. be in the range of about 10% of the nominal throughput quantity of the product P. However, other values are also possible. After reaching a maximum filling level of the buffer container 2 and/or of a maximum stop time the supply into the buffer container is completely stopped by the controller 9.

The transport of the product P can however be restarted after stopping the delivery of the end product for an allowable interruption time of the delivery of the end product. It is only after the interruption time has elapsed that the product is disposed of from the inlet line 8$a$, the pasteurization circuit 25 and the outlet line 8$b$ in case of the "aseptic cold-filling". This is done by supplying water W into the supply container 6 and pumping the water W into the inlet line 8$a$, further into the pasteurization circuit 25, further into the outlet line 8$b$ and finally into the disposal line 19. The instant of the complete disposal is measured by the second refractometer 17. In case of the "hot-filling" which is not showed herein, a heat exchanger for cooling down the product to be disposed of would be arranged in the disposal line.

A further advantage of the invention consists in that the allowable interruption time can be significantly extended, in case of stopping the delivery of the end product, because of the reduction of the quantity of the unpasteurized product P which is supplied into the buffer container 2 to a minimum product quantity per time unit. For example, an interruption time which is ten times longer is possible in case of a reduction of the product quantity to 10% of the nominal throughput quantity. In other words the buffer time until the system has to be entirely emptied extends.

When the operation of the pasteurization system 1 is restarted, the first refractometer 18 measures the density of the liquid flowing in the outlet line 8$b$, with the consequence that the instant of the readiness for operation and of the possible re-delivery of the end product can be determined.

The present invention allows an increase in flexibility during the pasteurization, particularly in case of the stop-go operation of a beverage production system, by using an active buffer for the product to be produced and a significant saving of the product in case of operation failures. Furthermore, the production quantity can be adjusted to the requirements because of the variably adjustable throughput quantity of the product.

Although advantageous embodiments of the invention have been shown and described, the invention is not restricted thereto but it may be executed and applied in other various ways within the scope of the following claims.

LIST OF REFERENCE NUMERALS

1=pasteurization system
2=buffer container
3=filling level meter
4=second control element
5=second pump
6=supply container
7=first pump
8a=inlet line
8b=outlet line
9=controller
10=first heat exchanger
11=pump of the heating circuit
12=second heat exchanger
13=recuperation zone
14=first control element
15=flow meter
16=heating circuit
17=second refractometer
18=first refractometer
19=disposal line
20=third heat exchanger
21=first switch
22=aseptic container
23=second switch
25=pasteurization circuit
D=steam
P=product
O=outlet of the end product
K=cooling water
L=filling level in the buffer circuit
W=water

The invention claimed is:

1. A method for pasteurizing a liquid product comprising at least one liquid component that can be pumped, the method comprising:
   (a) supplying the liquid product in an unpasteurized state out of a supply container into an inlet line leading to a pasteurization circuit comprising a buffer container;
   (b) supplying the liquid product in a heated state to the buffer container in the pasteurization circuit;
   (c) pasteurizing the liquid product in the buffer container to form a pasteurized product by maintaining the liquid product in the buffer container in the pasteurization circuit at a fluctuating flow rate and at a pasteurization temperature during a contact time for pasteurization; and
   (d) supplying the pasteurized product out of the buffer container and the pasteurization circuit into an outlet line.

2. The method according to claim 1, wherein the product is supplied out of the inlet line into the pasteurization circuit and into the buffer container via a feed pump arranged downstream of the supply container, and wherein the supplied quantity of the unpasteurized product per time unit is regulated by the feed pump.

3. The method according to claim 1, wherein the pasteurized product is supplied out of the buffer container and into the outlet line via a removal pump arranged downstream of the buffer container and wherein a supply quantity of the pasteurized product per time unit out of the buffer container is regulated by the removal pump.

4. The method according to claim 3, wherein the product is supplied out of the inlet line into the pasteurization circuit and into the buffer container via a feed pump arranged downstream of the supply container,
   wherein the supplied quantity of the unpasteurized product per time unit is regulated by the feed pump, and
   wherein a delivery quantity of the liquid product and/or the pasteurized product which is conveyed by the feed pump and/or the removal pump is calculated via a controller depending on at least one parameter and is adjusted via a control element for each of the removal pump and the feed pump.

5. The method according to claim 4, wherein after stopping or reducing delivery of the pasteurized product in the outlet line to an installation for further processing, the supplying of the pasteurized product out of the pasteurization circuit is effected by the controller.

6. The method according to claim 5, wherein after the stop or the reduction of the delivery of the pasteurized product to the installation the supply of the liquid product into the buffer container is reduced to a minimum product quantity per time unit, and wherein after reaching a maximum filling level of the buffer container and/or a maximum stop time, the supply of the liquid product into the buffer container is completely stopped via the controller.

7. The method according to claim 6, wherein after the stop or the reduction of the delivery of the pasteurized product the supplying of the pasteurized product out of the pasteurization circuit is restarted if an interruption time of the delivery is less than an allowable interruption time of the delivery of the pasteurized product.

8. The method according to claim 1, wherein the filling level of the liquid product in the heated state into the buffer container is measured via a filling level meter.

9. The method according to claim 6, wherein if a duration of the stop or of the reduction of the delivery of the pasteurized product to the installation for further processing exceeds an allowable interruption time, the liquid product is disposed of from the inlet line and the pasteurized product is disposed of from the pasteurization circuit and the outlet line by supplying water into the supply container and by pumping the water into the inlet line, further into the pasteurization circuit, further into the outlet line, and finally into a disposal line.

* * * * *